(12) United States Patent
Brest (10) Patent No.: US 9,285,653 B2
(45) Date of Patent: Mar. 15, 2016

(54) VARIABLE APERTURE MECHANISM FOR CREATING DIFFERENT APERTURE SIZES IN CAMERAS AND OTHER IMAGING DEVICES

(71) Applicant: Raytheon Company, Waltham, MA (US)

(72) Inventor: Michael L. Brest, Goleta, CA (US)

(73) Assignee: Raytheon Company, Waltham, MA (US)

( * ) Notice: Subject to any disclaimer, the term of this patent is extended or adjusted under 35 U.S.C. 154(b) by 82 days.

(21) Appl. No.: 13/669,996

(22) Filed: Nov. 6, 2012

(65) Prior Publication Data

US 2014/0125865 A1    May 8, 2014

(51) Int. Cl.
*H04N 5/225*     (2006.01)
*G03B 9/02*      (2006.01)

(52) U.S. Cl.
CPC ........................................ *G03B 9/02* (2013.01)

(58) Field of Classification Search
None
See application file for complete search history.

(56) References Cited

U.S. PATENT DOCUMENTS

| | | | |
|---|---|---|---|
| 3,082,674 A | | 3/1963 | Bagby |
| 3,938,168 A | | 2/1976 | Lange |
| 4,121,235 A | * | 10/1978 | Fujita et al. ................... 396/467 |
| 4,592,083 A | | 5/1986 | O'Brien |
| 4,995,700 A | | 2/1991 | Barney et al. |
| 5,128,796 A | | 7/1992 | Barney et al. |
| 5,402,202 A | | 3/1995 | Washisu et al. |
| 5,432,576 A | * | 7/1995 | SanGregory ............. G03B 9/24 396/449 |
| 5,689,746 A | | 11/1997 | Akada et al. |
| 5,775,276 A | | 7/1998 | Yanai et al. |
| 5,991,143 A | | 11/1999 | Wright et al. |
| 6,128,175 A | | 10/2000 | Wright et al. |
| 6,133,569 A | | 10/2000 | Shoda et al. |
| 6,285,151 B1 | | 9/2001 | Wright et al. |
| 6,366,441 B1 | | 4/2002 | Ozawa et al. |
| 6,423,419 B1 | | 7/2002 | Teer et al. |
| 6,515,285 B1 | | 2/2003 | Marshall et al. |

(Continued)

FOREIGN PATENT DOCUMENTS

| | | |
|---|---|---|
| EP | 2416216 A1 | 2/2012 |
| GB | 2446606 A | 8/2008 |

(Continued)

OTHER PUBLICATIONS

Kazuhisa Miyoshi, et al., "Durability Evaluation of Selected Solid Lubricating Films", May 2001, 12 pages.

(Continued)

*Primary Examiner* — Twyler Haskins
*Assistant Examiner* — Wesley J Chiu (57) ABSTRACT

An apparatus includes a first blade configured to be coupled to a first magnet and a second blade configured to be coupled to a second magnet. At least one of the blades has at least one cutout. The apparatus also includes electromagnetic motors configured to generate different electromagnetic fields to (i) cause the magnets to move the blades into a first configuration and (ii) cause the magnets to move the blades into a second configuration. The blades are separated to form a larger aperture in the first configuration, and the at least one cutout in the blades forms a smaller aperture in the second configuration. The apparatus may further include a cover plate and a base plate. The base plate can include an opening that defines the larger aperture and blade stops and stop pins configured to stop movement of the blades.

20 Claims, 4 Drawing Sheets

(56) References Cited

U.S. PATENT DOCUMENTS

| | | | |
|---|---|---|---|
| 6,995,359 | B1 | 2/2006 | Hillenbrand et al. |
| 7,410,310 | B2 | 8/2008 | Kihara |
| 8,164,813 | B1 | 4/2012 | Gat et al. |
| 8,911,163 | B1 * | 12/2014 | Yanevich ............. G01J 3/0286 396/449 |
| 2002/0030163 | A1 | 3/2002 | Zhang |
| 2004/0238741 | A1 | 12/2004 | Gat et al. |
| 2005/0035870 | A1 | 2/2005 | Bauerle et al. |
| 2006/0255275 | A1 | 11/2006 | Garman et al. |
| 2007/0046143 | A1 | 3/2007 | Blandino et al. |
| 2007/0098398 | A1 * | 5/2007 | Hagiwara ............ H04N 5/2254 396/505 |
| 2007/0279793 | A1 | 12/2007 | Hansen et al. |
| 2007/0280679 | A1 | 12/2007 | Kato et al. |
| 2008/0017816 | A1 | 1/2008 | Willats et al. |
| 2008/0030891 | A1 | 2/2008 | Kim et al. |
| 2008/0094728 | A1 | 4/2008 | Matsumoto et al. |
| 2008/0304126 | A1 | 12/2008 | Powell et al. |
| 2009/0293654 | A1 | 12/2009 | Pintauro |
| 2010/0053412 | A1 | 3/2010 | Sekimoto et al. |
| 2010/0189432 | A1 * | 7/2010 | Viglione ................. G03B 9/10 396/468 |
| 2010/0220988 | A1 * | 9/2010 | Ohno ........................... 396/242 |
| 2011/0091198 | A1 * | 4/2011 | Hasegawa ............... G03B 9/02 396/505 |
| 2011/0174979 | A1 * | 7/2011 | Garman et al. ............... 250/352 |
| 2011/0206362 | A1 | 8/2011 | Viglione et al. |
| 2011/0211823 | A1 | 9/2011 | Tsai |
| 2011/0234892 | A1 * | 9/2011 | Yasuda et al. ................ 348/374 |
| 2012/0019404 | A1 | 1/2012 | Brosio |
| 2012/0063014 | A1 * | 3/2012 | Terahara et al. .............. 359/813 |
| 2012/0257099 | A1 | 10/2012 | Tsai |
| 2012/0260002 | A1 | 10/2012 | Hildebran et al. |
| 2014/0061467 | A1 | 3/2014 | Buzerak et al. |
| 2014/0126848 | A1 * | 5/2014 | Vukobratovich ..... C23C 14/165 384/420 |

FOREIGN PATENT DOCUMENTS

| | | |
|---|---|---|
| JP | 2001172766 | 6/2001 |
| JP | 2007114672 A | 5/2007 |
| WO | WO 95/33226 | 12/1995 |

OTHER PUBLICATIONS

M. A. Sherbiney et al., "Friction and Wear of Ion-Plated Soft Metallic Films", Wear, 45 (1977), p. 211-220.
S. Jahanmir, et al., "Sliding Wear Resistance of Metallic Coated Surfaces", Wear, 40 (1976), p. 75-84.
Donald F. King, et al., "3rd-generation MW/LWIR sensor engine for advanced tactical systems", Infrared Technology and Applications XXXIV, Proc. of SPIE, vol. 6940, 2008, 12 pages.
"Diaphragm (optics)", Wikipedia, Oct. 7, 2012, 7 pages.
"Aperture", Wikipedia, Nov. 4, 2012, 9 pages.
International Search Report dated Feb. 6, 2014 in connection with International Patent Application No. PCT/US2013/068649, 5 pages.
Written Opinion of International Searching Authority dated Feb. 6, 2014 in connection with International Patent Application No. PCT/US2013/068649, 5 pages.
U.S. Application entitle "Thermal Control in Variable Aperture Mechanism for Cryogenic Environment" U.S. Appl. No. 14/170,348, dated Jan. 31, 2014; 23 pages.
U.S. Office Action dated Mar. 31, 2014 in connection with U.S. Appl. No. 14/170,348; 10 pages.
U.S. Office Action dated Aug. 18, 2014 in connection with U.S. Appl. No. 14/091,128; 14 pages.
Notice of Allowance dated Aug. 4, 2014 in connection with U.S. Appl. No. 14/170,237; 13 pages.
U.S. Office Action dated Dec. 4, 2014 in connection with U.S. Appl. No. 14/170,348; 19 pages.
International Search Report and Written Opinion dated Oct. 29, 2014 in connection with International Patent Application No. PCT/US2014/041963, 8 pages.
International Search Report and Written Opinion dated Oct. 27, 2014 in connection with International Patent Application No. PCT/US2014/042009, 8 pages.
International Search Report and Written Opinion dated Nov. 12, 2014 in connection with International Patent Application No. PCT/US2014/041769, 12 pages.
International Search Report and Written Opinion dated Oct. 29, 2014 in connection with International Patent Application No. PCT/US2014/041966, 8 pages.
U.S. Office Action dated May 21, 2015 in connection with U.S. Appl. No. 14/170,276; 24 pages.
U.S. Office Action dated May 7, 2015 in connection with U.S. Appl. No. 14/091,128; 18 pages.
U.S. Office Action dated Mar. 13, 2015 in connection with U.S. Appl. No. 14/088,176; 13 pages.
U.S. Office Action dated May 20, 2015 in connection with U.S. Appl. No. 14/071,970; 25 pages.
Yukio Miyakawa, "Friction and Wear Performance of Gold and Gold Alloy Films"; National Aerospace Laboratory, Tokyo Japan; 1980; pp. 21-30.
Charles S. Clark; "Resolution for Fretting Wear Contamination on Cryogenic Mechanism"; 41st Aerospace Mechanisms Symposium, Jet Propulsion Laboratory; May 16-18, 2012; pp. 399-410.
Donald H. Buckley; "Friction, Wear, and Lubrication in Vacuum"; National Aeronautics and Space Administration; 1971; 191 pages.
International Search Report and Written Opinion dated Feb. 5, 2014 in connection with International Patent Application No. PCT/US2013/068678.
International Search Report dated Oct. 27, 2014 in connection with International Patent Application No. PCT/US2014/042010.
U.S. Office Action dated Sep. 18, 2015 in connection with U.S. Appl. No. 14/170,276; 25 pages.
U.S. Office Action dated Nov. 13, 2015 in connection with U.S. Appl. No. 14/071,970; 19 pages.

* cited by examiner

VARIABLE APERTURE MECHANISM FOR CREATING DIFFERENT APERTURE SIZES IN CAMERAS AND OTHER IMAGING DEVICES

TECHNICAL FIELD

This disclosure is directed generally to imaging systems. More specifically, this disclosure relates to a variable aperture mechanism for creating different aperture sizes in cameras and other imaging devices.

BACKGROUND

Digital cameras and other imaging devices typically include an adjustable aperture to control the amount of light reaching an image sensor. Larger apertures allow more light to reach an image sensor, while smaller apertures allow less light to reach an image sensor. Conventional variable apertures often rely on a traditional rotating iris approach in which multiple rotary blades are moved by small piezoelectric motors. Unfortunately, this approach typically requires a larger number of components and complex drive circuitry for the motors. Also, traditional rotating irises typically wear out after a few thousand actuations or a few tens of thousands of actuations, rendering them unsuitable for use in some applications like those requiring hundreds of thousands of actuations. In addition, the blades that form an aperture are often thermally unstable, which can compromise the quality of the imaging device.

SUMMARY

This disclosure provides a variable aperture mechanism for creating different aperture sizes in cameras and other imaging devices.

In a first embodiment, an apparatus includes a first blade configured to be coupled to a first magnet and a second blade configured to be coupled to a second magnet. At least one of the blades has at least one cutout. The apparatus also includes electromagnetic motors configured to generate different electromagnetic fields to (i) cause the magnets to move the blades into a first configuration and (ii) cause the magnets to move the blades into a second configuration. The blades are separated to form a larger aperture in the first configuration, and the at least one cutout in the blades forms a smaller aperture in the second configuration.

In a second embodiment, a system includes a variable aperture system and a cooling system. The variable aperture system includes a first blade configured to be coupled to a first magnet and a second blade configured to be coupled to a second magnet, where at least one of the blades has at least one cutout. The variable aperture system also includes electromagnetic motors configured to generate different electromagnetic fields to (i) cause the magnets to move the blades into a first configuration and (ii) cause the magnets to move the blades into a second configuration. The blades are separated to form a larger aperture in the first configuration, and the at least one cutout in the blades forms a smaller aperture in the second configuration. The cooling system is configured to cool at least a portion of the variable aperture system including the blades.

In a third embodiment, a method includes generating first electromagnetic fields that cause magnets to move first and second blades of an aperture mechanism into a first configuration, where the blades are separated to form a larger aperture in the first configuration. The method also includes generating second electromagnetic fields that cause the magnets to move the blades of the aperture mechanism into a second configuration, where at least one cutout in at least one of the blades forms a smaller aperture in the second configuration.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
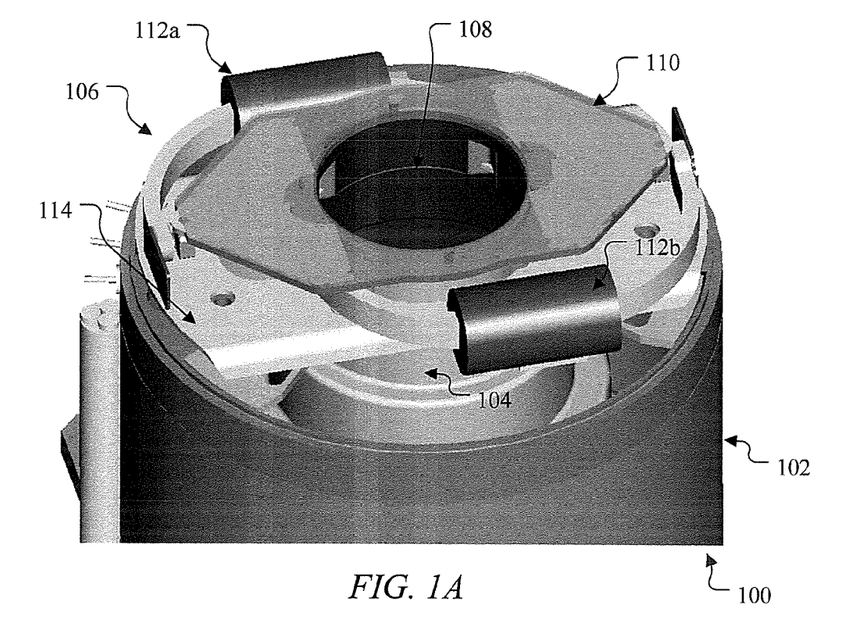
FIGS. 1A and 1B illustrate an example imaging device with a variable aperture mechanism in accordance with this disclosure.
Figure 1B:
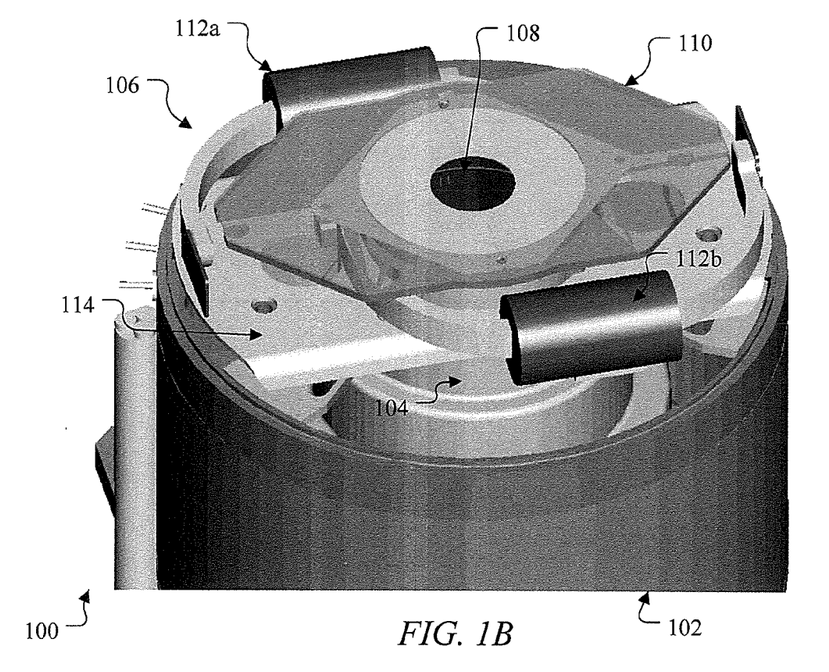

FIGS. 1A and 1B illustrate an example imaging device 100 with a variable aperture mechanism in accordance with this disclosure. As shown in FIGS. 1A and 1B, the imaging device 100 includes a housing 102. The housing 102 encases and protects other components of the imaging device 100. In some embodiments, the housing 102 can engage with a cover to create a vacuum chamber within at least part of the housing 102 (although the use of a vacuum environment is not required). The housing 102 includes any suitable structure for encasing other components of an imaging device. The housing 102 could also be formed from any suitable material(s) and in any suitable manner.

The device 100 also includes a cooling system 104, a portion of which is shown here. Among other things, the cooling system 104 is used to cool portions of an aperture system 106. The cooling system 104 can cool the portions of the aperture system 106 to any suitable temperature, which could vary depending on the application. In some embodiments, for example, the cooling system 104 could cool portions of the aperture system 106 to a temperature around 100° K. The cooling system 104 includes any suitable structure for cooling one or more components, such as to cryogenic temperatures.

The aperture system 106 adjusts an opening or aperture 108 of the imaging device 100. As shown in FIG. 1A, the aperture 108 could have a larger size in one configuration, and the larger size can be defined by the aperture system 106 or by the opening of the structure below the aperture system 106 (such as a cold shield of the cooling system 104). As shown in FIG. 1B, the aperture 108 could have a smaller size in another configuration. The aperture system 106 therefore allows the device 100 to control an amount of light provided to an image sensor within the device 100. Note that any suitable aperture sizes could be supported by the aperture system 106. For example, the larger aperture size shown in FIG. 1A could represent an f/2 aperture size, while the smaller aperture size shown in FIG. 1B could represent an f/5 aperture size.

In this example, the aperture system 106 includes an aperture mechanism 110 that adjusts the size of the aperture 108. The aperture system 106 also includes multiple motors 112a-112b and a motor mount 114. As described below, the aperture mechanism 110 includes two blades that can be moved back and forth by the motors 112a-112b to adjust the size of the aperture 108. The motors 112a-112b can generate electromagnetic fields, and magnets in or coupled to the blades can be affected by the electromagnetic fields. This allows the motors 112a-112b to move the blades without actually contacting the blades. The motor mount 114 mounts the motors 112a-112b to the housing 102. In some embodiments, the housing 102, the motors 112a-112b, and the motor mount 114 could be kept at room or ambient temperature, while the aperture mechanism 110 could be kept at a cryogenic or other lower temperature. This enables the aperture mechanism 110 to be thermally isolated from the components at room or ambient temperature, even though the other components are used to adjust the aperture mechanism 110. Additional details regarding the aperture system 106 are provided below.

The imaging device 100 shown here could represent part of any suitable larger device or system. For example, the imaging device 100 could be used as part of an infrared sensor that requires the use of two aperture sizes. The imaging device 100 could also meet various specifications that conventional iris mechanisms are unable to satisfy. For instance, the aperture system 106 could operate over hundreds of thousands of actuations, such as five hundred thousand actuations or more. In addition, the aperture system 106 is able to operate effectively in vacuum environments.

The aperture system 106 can replace more complex rotary iris mechanisms (which may require numerous blades with numerous piezoelectric motors and motor drivers) with a design that uses two movable blades and two electromagnetic motors. This can simplify the design and cost of the aperture system 106. Also, the aperture mechanism 110 can be mounted directly to the cold stage of the cooling system 104, allowing improved temperature control of the aperture mechanism 110. Further, the blades of the aperture mechanism 110 can be captured inside upper and lower plates, providing a simple and physically light design that allows improved temperature control of the blades. Moreover, material selection of components within the aperture system 106 can produce good wear characteristics, neutral coefficient of thermal expansion (CTE) issues, and improved stability at cryogenic temperatures. In addition, the design of the aperture system 106 allows both large and small apertures to be supported by the same aperture system 106, helping to simplify the design of a cold shield or other structure on which the aperture system 106 is mounted.

Although FIGS. 1A and 1B illustrate one example of an imaging device 100 with a variable aperture mechanism, various changes may be made to FIGS. 1A and 1B. For example, the aperture system 106 shown here could be used with any suitable device or system and is not limited to use with the imaging device 100. Also, note that multiple smaller apertures could be supported by the aperture system 106.

Figure 2:
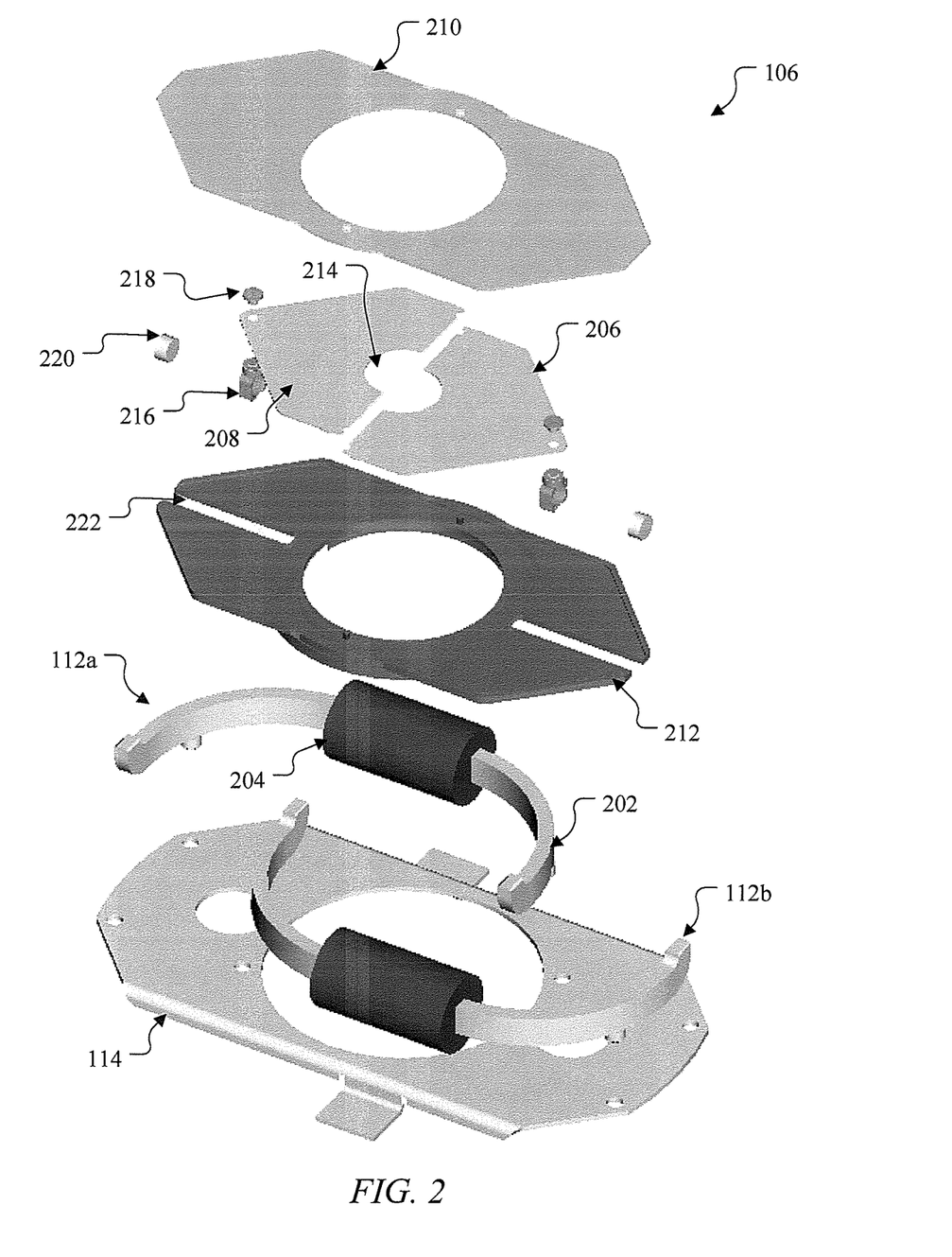
FIG. 2 illustrates an example variable aperture system in accordance with this disclosure.

FIG. 2 illustrates an example variable aperture system in accordance with this disclosure. In particular, FIG. 2 illustrates one example embodiment of the aperture system 106. For ease of explanation, the aperture system 106 is described as being used in the imaging device 100 of FIGS. 1A and 1B. However, the aperture system 106 could be used in any other suitable device or system.

As shown in FIG. 2, the aperture system 106 includes the motors 112a-112b and the motor mount 114. The motors 112a-112b can be mounted on or to the motor mount 114, and the motor mount 114 can be mounted on or to the housing 102 of the imaging device 100. This secures the motors 112a-112b in place within the housing 102. In this example, each motor 112a-112b represents an electromagnet having a core 202 and a coil 204. The core 202 represents any suitable core that can be used to create an electromagnetic field, such as an iron core. Current flowing through the coil 204 creates an electromagnetic field in the core 202. The direction of current flow through the coil 204 controls which end of the core 202 is the magnetic "north" pole and which end of the core 202 is the magnetic "south" pole. The coil 204 represents any suitable conductive structure through which an electrical current can flow to create an electromagnetic field in the core 202, such as wound wire.

The aperture mechanism here includes two blades 206-208, a cover plate 210, and a base plate 212. The cover plate 210 can be secured to the base plate 212 to thereby define a space between the plates 210-212 for the blades 206-208. The blades 206-208 can move back and forth within this space to alter the size of the aperture 108. Each blade 206-208 includes a semicircular cutout 214, and the cutouts 214 collectively form the smaller aperture 108. Note that semicircular cutouts and circular apertures are for illustration only, and cutouts and apertures could have any other desired shape(s). Also note that the blades 206-208 could have unequal cutouts, or a single blade could have a cutout.

Each blade 206-208 includes any suitable structure defining a portion of an aperture and configured to be moved to change the size of an aperture. Each blade 206-208 could be formed from any suitable material(s) and in any suitable manner. In some embodiments, the blades 206-208 are formed from metal(s) or other thermally conductive material(s) to help maintain a substantially uniform temperature across the blades 206-208. In particular embodiments, the blades 206-208 are formed from beryllium copper and covered with sputtered gold.

The cover plate 210 and base plate 212 include any suitable structures for covering the blades of an aperture mechanism. The cover plate 210 could perform other functions, such as shielding the blades 206-208 from radiation loading and providing a cold conductive path. The base plate 212 could also perform other functions, such as defining the larger size of the aperture 108 and providing a cold conductive path. Each plate 210-212 could be formed from any suitable material(s) and in any suitable manner. In some embodiments, the plates 210-212 are formed from metal(s) or other thermally conductive material(s). In particular embodiments, the plates 210-212 are formed from NITRONIC 60 or other stainless steel alloy.

As shown in FIG. 2, each plate 206-208 is connected to a magnet holder 216, which is secured to that plate using a pin 218. Each magnet holder 216 receives and retains a magnet 220 in a desired orientation. For example, the magnet holder 216 can retain the magnet 220 so that the magnetic north pole of the magnet 220 faces one direction and the magnetic south pole of the magnet 220 faces another direction. The base plate 212 includes multiple passages 222 allowing the magnet holders 216 and associated magnets 220 to pass linearly through the base plate 212 during movement of the plates 206-208. Each magnet holder 216 includes any suitable structure for retaining a magnet. Each pin 218 includes any suitable structure for coupling a magnet holder to a blade. Note that any other suitable mechanism could be used to join a blade and a magnet holder, including forming the magnet holder integral with the blade. Each magnet 220 includes any suitable magnetic structure that can be moved by an electromagnetic motor.

The magnets 220 operate in conjunction with the motors 112a-112b to move the blades 206-208 back and forth. For example, to create a smaller aperture 108, the motors 112a-112b can generate electromagnetic fields with the appropriate north/south pole arrangements to push/pull the magnets 220 towards the center of the aperture mechanism 110. This moves the blades 206-208 inward and narrows the aperture 108. Once the blades 206-208 have moved inward and currents through the motors 112a-112b have stopped, the blades 206-208 can be held in place by the magnetic attraction of the magnets 220 to the nearby portions of the motor cores 202. Similarly, to create a larger aperture 108, the motors 112a-112b can generate electromagnetic fields with the appropriate north/south pole arrangements to push/pull the magnets 220 away from the center of the aperture mechanism 110. This moves the blades 206-208 outward and enlarges the aperture 108. Once the blades 206-208 have moved outward and currents through the motors 112a-112b have stopped, the blades 206-208 can again be held in place by the magnetic attraction of the magnets 220 to the nearby portions of the motor cores 202.

In this example, the cores 202 are curved so that each core 202 has a portion located adjacent to each magnet 220. That is, the motor 112a has a core 202 with one portion next to the magnet 220 of the blade 206 and one portion next to the magnet 220 of the blade 208. Similarly, the motor 112b has a core 202 with one portion next to the magnet 220 of the blade 206 and one portion next to the magnet 220 of the blade 208. In this arrangement, both motors 112a-112b can be used to move the blade 206, and both motors 112a-112b can be used to move the blade 208. Note, however, that each motor 112a-112b could have a core 202 located next to a single magnet 220. In that arrangement, one motor 112a can be used to move the blade 206, and another motor 112b can be used to move the blade 208.

a portion of one core 202 is on one side of each magnet 220 and a portion of the other core is on the opposite side of each magnet 220.

Although FIG. 2 illustrates one example of a variable aperture system 106, various changes may be made to FIG. 2. For example, various components in FIG. 2 could be combined into an integral unit or further subdivided. Also, each component in FIG. 2 could have any suitable size, shape, and dimensions. Further, multiple smaller apertures could be supported by the aperture system 106. For instance, the aperture system 106 could include multiple pairs of blades 206-208, where each pair is associated with a different smaller aperture. These different pairs of blades could be actuated using different motors, allowing one of multiple aperture sizes to be created.

Figure 3:
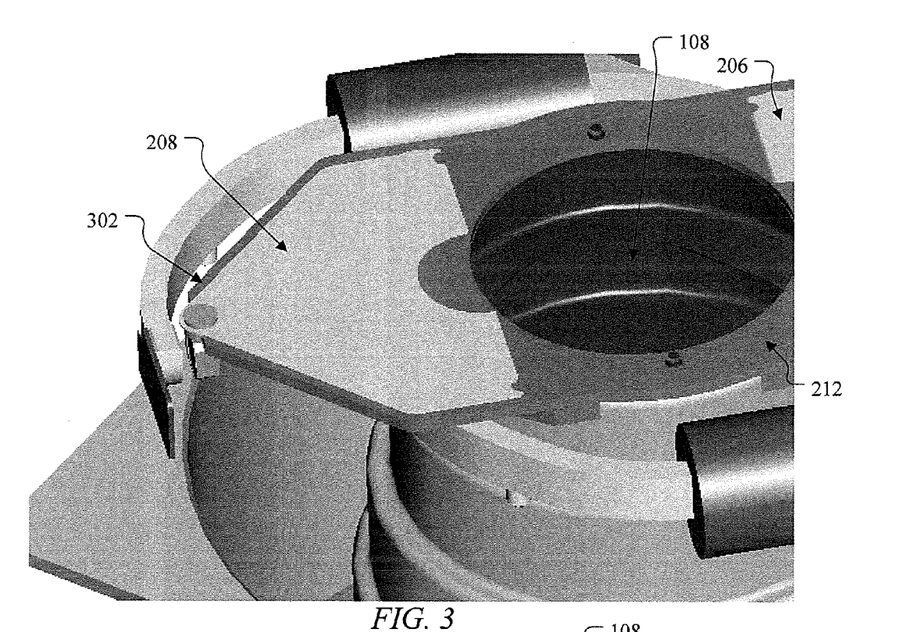
FIGS. 3 through 5 illustrate additional features of an example variable aperture system in accordance with this disclosure.
Figure 4:
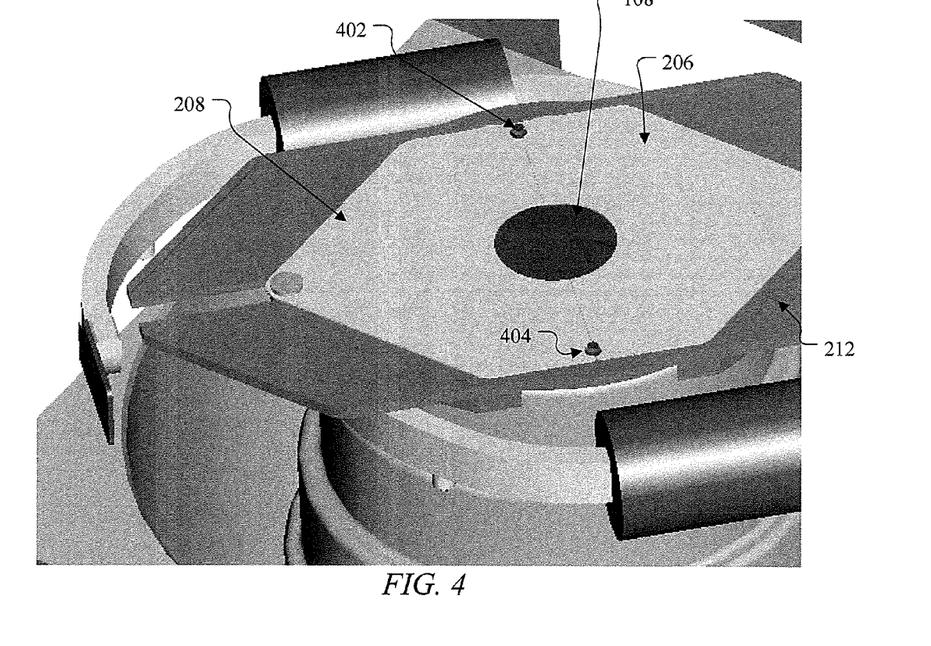
Figure 5:
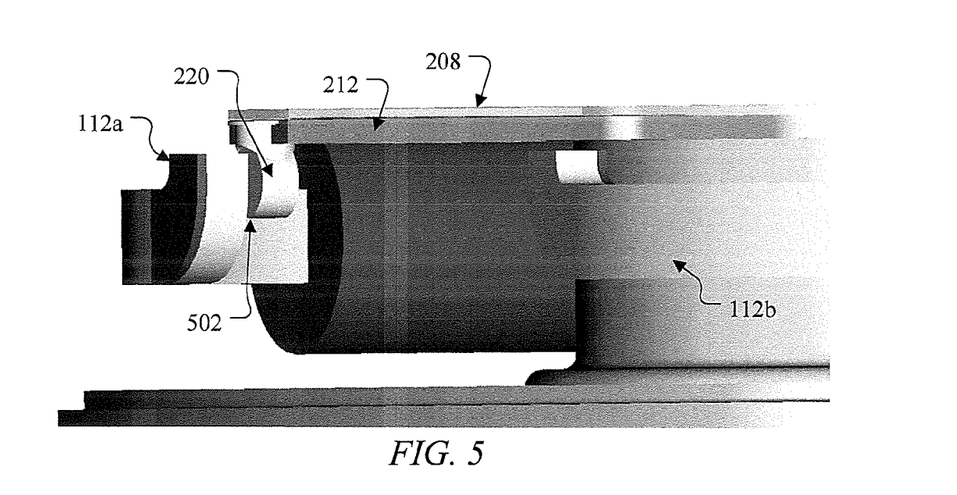

FIGS. 3 through 5 illustrate additional features of an example variable aperture system in accordance with this disclosure. As shown in FIG. 3, the cover plate 210 has been removed for clarity. As shown here, the blades 206-208 of the aperture mechanism have been moved to their fully open position. In this position, the size of the aperture 108 is defined by the base plate 212 or by the underlying structure, and the blades 206-208 contact blade stops 302. The blade stops 302 represent raised portions of the base plate 212. In this example, the blade stops 302 are V-shaped to match the shape of the blades 206-208, although other shapes could be used (such as when the blades 206-208 have other shapes). The blade stops 302 can physically contact the blades 206-208 to stop movement of the blades 206-208. Moreover, because the blades 206-208 physically contact the blade stops 302, heat can be transferred between the blades 206-208 and the blade stops 302. This helps in the thermal management of the blades' temperature.

As shown in FIG. 4, the cover plate 210 has again been removed for clarity. As shown here, the blades 206-208 of the aperture mechanism have been moved to their fully closed position. In this position, the size of the aperture 108 is defined by the cutouts on the blades 206-208, and the blades 206-208 contact stop pins 402. The stop pins 402 denote structures that are connected to or part of the base plate 212. The stop pins 402 can be formed from any suitable material(s) and can have any suitable size and shape. The stop pins 402 can physically contact the blades 206-208 to stop the inward movement of the blades 206-208. Note that the blades 206-208 can include recesses 404 that match the shape of the stop pins 402, allowing the blades 206-208 to contact one another and block substantially all light except the light passing through the aperture 108. Moreover, because the blades 206-208 physically contact the stop pins 402, heat can be transferred between the blades 206-208 and the stop pins 402. This again helps in the thermal management of the blades' temperature.

As shown in FIG. 5, the blades 206-208 of the aperture mechanism have again been fully opened. As shown in FIG. 5, the magnet 220 attached to the blade 208 is separated from the core of the nearby motor 112a by a gap 502. This gap 502 exists because the blade stop 302 of the base plate 212 prevents the magnet 220 from moving closer to the motor 112a. Even when the motor 112a is turned off, the magnet 220 is magnetically attracted to the core of the motor 112a, helping to keep the blade 208 locked in place. The presence of the gap 502 helps to ensure that no physical contact occurs between the motor 112a and the blade 208. This again helps in the thermal management of the blade's temperature since no physical thermal conduction path exists between the motor 112a and the blade 208. Note that a similar gap exists between the blade 208 and the motor 112b when the blades 206-208 are closed.

In FIG. 5, the blade 208 is moved by controlling the magnetic north and south poles of each motor 112a-112b. For example, assume the magnet 220 attached to the blade 208 is oriented so that its magnetic north pole faces outward and its magnetic south pole faces inward. To move the blade 208 outward, the directions of currents through the coils of the motors 112a-112b are controlled so that the motor 112a has a magnetic south pole near the magnet 220 and so that the motor 112b has a magnetic south pole near the magnet 220. As a result, the motor 112a pulls the magnet 220 outward, and the motor 112b pushes the magnet 220 outward. Similarly, to move the blade 208 inward, the directions of currents through the coils of the motors 112a-112b are reversed so that the motor 112a has a magnetic north pole near the magnet 220 and so that the motor 112b has a magnetic north pole near the magnet 220. In this configuration, the motor 112a pushes the magnet 220 inward, and the motor 112b pulls the magnet 220 inward. The magnet 220 attached to the blade 206 can have an opposite orientation so that its magnetic north pole faces inward and its magnetic south pole faces outward. The blade 206 would therefore move in the same manner (inward or outward) as the blade 208 with the same magnetic poles created by the motors 112a-112b.

Although FIGS. 3 through 5 illustrate additional features of an example variable aperture system, various changes may be made to FIGS. 3 through 5. For example, various components in FIGS. 3 through 5 could be combined into an integral unit or further subdivided. Also, each component in FIGS. 3 through 5 could have any suitable size, shape, and dimensions.

Depending on the implementation, the variable aperture system described above could have various advantages. For example, as shown in FIG. 2, the aperture system could have only twelve parts, and fewer parts could be obtained if various components in FIG. 2 are combined. Only two blades 206-208 (and their associated components 216-220) may move within the aperture system 106 based on the operation of two motors 112a-112b, further reducing the complexity of the system. A passive unpowered mechanism (the magnets 220) can hold the blades 206-208 in place even after deactivation of the motors 112a-112b, which helps to reduce power consumption. The design of the aperture system helps to address thermal instability of the blades 206-208, such as through the use of the thermally-conductive blade stops 302 and stop pins 402 and through the thermal isolation of the aperture mechanism 110 from the motors 112a-112b and housing 102. Beyond that, the blades 206-208 can have low thermal mass and low physical mass to enable faster cooling, and the aperture system 106 can be designed with vacuum-compatible materials. In addition, the aperture system 106 can enable fast aperture size changes, provide a balanced or symmetrical structure, be fabricated using standard techniques and common materials, and support a "common system structure" where the larger aperture size is defined by the cold shield or other component on which the aperture mechanism 110 is mounted.

Figure 6:
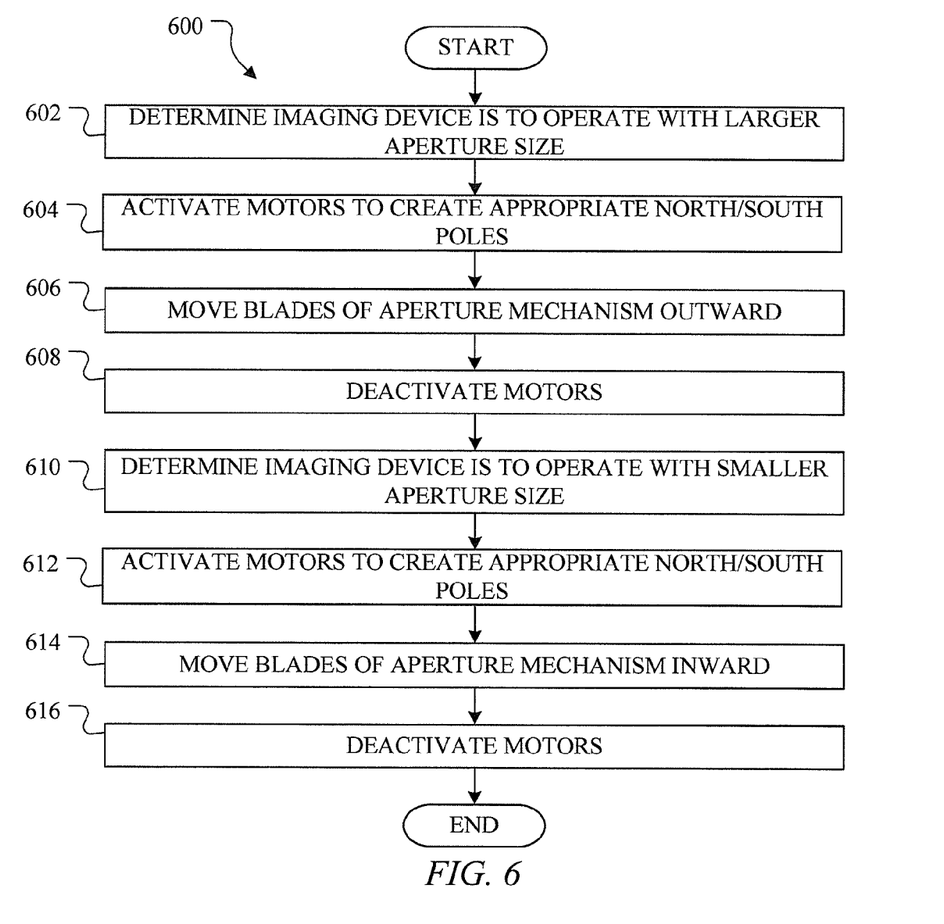
FIG. 6 illustrates an example method for operating a variable aperture system in accordance with this disclosure.

FIG. 6 illustrates an example method 600 for operating a variable aperture system in accordance with this disclosure. As shown in FIG. 6, an imaging device determines that it is to operate with a larger aperture size at step 602. This could include, for example, a controller or other component determining that a larger aperture size is needed with an infrared sensor or other imaging device. In response, motors are activated to create appropriate north/south poles in the motors' cores at step 604, and the blades of an aperture mechanism are moved outward at step 606. The orientations of the north/south poles in the motors 112a-112b depend on the orientations of the magnets 220 attached to the blades 206-208. This allows the motors 112a-112b to move the blades 206-208 outward without actually contacting the blades 206-208. The blades 206-208 can move outward until they contact the blade stops 302, which prevent the blades 206-208 from moving outward any further. The motors are deactivated at step 608. This stops the motors 112a-112b from creating magnetic north and south poles, but the magnets 220 can remain magnetically attracted to the nearby portions of the cores 222, helping to keep the blades 206-208 locked in their outward positions.

The imaging device determines that it is to operate with a smaller aperture size at step 610. This could include, for example, the controller or other component determining that a smaller aperture size is needed with the infrared sensor or other imaging device. In response, motors are activated to create appropriate north/south poles in the motors' cores at step 612, and the blades of the aperture mechanism are moved inward at step 614. Again, the orientations of the north/south poles in the motors 112a-112b depend on the orientations of the magnets 220 attached to the blades 206-208. This allows the motors 112a-112b to move the blades 206-208 inward without actually contacting the blades 206-208. The blades 206-208 can move inward until they contact the stop pins 402, which prevent the blades 206-208 from moving inward any further. The motors are deactivated at step 616. This stops the motors 112a-112b from creating magnetic north and south poles, but the magnets 220 can remain magnetically attracted to the nearby portions of the cores 222, helping to keep the blades 206-208 locked in their inward positions.

Although FIG. 6 illustrates one example of a method 600 for operating a variable aperture system, various changes may be made to FIG. 6. For example, while shown as a series of steps, various steps in FIG. 6 could overlap, occur in parallel, occur in a different order, or occur any number of times. As a particular example, the imaging device could repeatedly switch between the larger and smaller aperture sizes at any suitable times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a first blade configured to be coupled to a first magnet and a second blade configured to be coupled to a second magnet, at least one of the blades having at least one cutout; and
   electromagnetic motors configured to generate different electromagnetic fields to (i) cause the magnets to move the blades into a first configuration and (ii) cause the magnets to move the blades into a second configuration;
   wherein the blades are configured to be separated to form a larger aperture in the first configuration;
   wherein the at least one cutout in the at least one of the blades forms a smaller aperture in the second configuration; and
   wherein each electromagnetic motor comprises a curved core, a first portion of each core configured to be located proximate to the first magnet, a second portion of each core configured to be located proximate to the second magnet.

2. The apparatus of claim 1, wherein:
   the electromagnetic motors are coupled to a motor mount, the motor mount configured to be coupled to a first portion of a structure; and
   the blades form a portion of an aperture mechanism, the aperture mechanism configured to be coupled to a second portion of the structure.

3. The apparatus of claim 1, wherein each magnet in the first and second configurations is separated from the cores by gaps.

4. The apparatus of claim 1, further comprising:
a cover plate and a base plate, the cover plate and the base plate configured to be coupled together to form a space within which the blades are located;
wherein the base plate comprises an opening that defines the larger aperture.

5. The apparatus of claim 1, wherein:
each blade comprises a semicircular cutout; and
the cutouts form the smaller aperture in the second configuration, the smaller aperture comprising a circular aperture.

6. An apparatus comprising:
a first blade configured to be coupled to a first magnet and a second blade configured to be coupled to a second magnet, at least one of the blades having at least one cutout; and
electromagnetic motors configured to generate different electromagnetic fields to (i) cause the magnets to move the blades into a first configuration and (ii) cause the magnets to move the blades into a second configuration;
wherein the blades are configured to be separated to form a larger aperture in the first configuration;
wherein the at least one cutout in the at least one of the blades forms a smaller aperture in the second configuration;
wherein the electromagnetic motors are coupled to a motor mount, the motor mount configured to be coupled to a housing;
wherein the blades form a portion of an aperture mechanism, the aperture mechanism configured to be coupled to a cooling system such that the aperture mechanism is thermally isolated from the motor mount, the electromagnetic motors, and the housing; and
wherein each electromagnetic motor comprises a curved core, a first portion of each core configured to be located proximate to the first magnet, a second portion of each core configured to be located proximate to the second magnet.

7. An apparatus comprising:
a first blade configured to be coupled to a first magnet and a second blade configured to be coupled to a second magnet, at least one of the blades having at least one cutout;
electromagnetic motors configured to generate different electromagnetic fields to (i) cause the magnets to move the blades into a first configuration and (ii) cause the magnets to move the blades into a second configuration; and
a cover plate and a base plate, the cover plate and the base plate configured to be coupled together to form a space within which the blades are located;
wherein the blades are configured to be separated to form a larger aperture in the first configuration;
wherein the at least one cutout in the at least one of the blades forms a smaller aperture in the second configuration;
wherein the base plate comprises:
an opening that defines the larger aperture;
blade stops configured to stop movement of the blades when the blades are moving outward; and
stop pins configured to stop movement of the blades when the blades are moving inward; and
wherein the blade stops and the stop pins are configured to thermally contact the blades in order to exchange heat with the blades.

8. The apparatus of claim 7, wherein the blade stops comprise raised portions of the base plate.

9. A system comprising:
a variable aperture system comprising:
a first blade configured to be coupled to a first magnet and a second blade configured to be coupled to a second magnet, at least one of the blades having at least one cutout; and
electromagnetic motors configured to generate different electromagnetic fields to (i) cause the magnets to move the blades into a first configuration and (ii) cause the magnets to move the blades into a second configuration;
wherein the blades are configured to be separated to form a larger aperture in the first configuration; and
wherein the at least one cutout in the at least one of the blades forms a smaller aperture in the second configuration;
a cooling system configured to cool at least the blades of the variable aperture system; and
a housing, wherein the electromagnetic motors are coupled to a motor mount, the motor mount configured to be coupled to the housing;
wherein the blades form a portion of an aperture mechanism, the aperture mechanism configured to be coupled to the cooling system.

10. The system of claim 9, wherein:
each electromagnetic motor comprises a core; and
each magnet in the first and second configurations is separated from the cores by gaps.

11. The system of claim 9, wherein the variable aperture system further comprises a cover plate and a base plate, the cover plate and the base plate configured to be coupled together to form a space within which the blades are located; and
wherein the base plate comprises an opening that defines the larger aperture.

12. The system of claim 9, wherein:
each blade comprises a semicircular cutout; and
the cutouts form the smaller aperture in the second configuration, the smaller aperture comprising a circular aperture.

13. The system of claim 9, wherein the variable aperture system and the cooling system comprise portions of an imaging device.

14. A system comprising:
a variable aperture system comprising:
a first blade configured to be coupled to a first magnet and a second blade configured to be coupled to a second magnet, at least one of the blades having at least one cutout; and
electromagnetic motors configured to generate different electromagnetic fields to (i) cause the magnets to move the blades into a first configuration and (ii) cause the magnets to move the blades into a second configuration;
wherein the blades are configured to be separated to form a larger aperture in the first configuration; and
wherein the at least one cutout in the at least one of the blades forms a smaller aperture in the second configuration; and
a cooling system configured to cool at least the blades of the variable aperture system;
wherein each electromagnetic motor comprises a curved core;
wherein a first portion of each core is configured to be located proximate to the first magnet; and
wherein a second portion of each core is configured to be located proximate to the second magnet.

15. The system of claim 14, wherein:
the system further comprises a housing;
the electromagnetic motors are coupled to a motor mount, the motor mount configured to be coupled to the housing; and
the blades form a portion of an aperture mechanism, the aperture mechanism configured to be coupled to the cooling system.

16. A system comprising:
a variable aperture system comprising:
   a first blade configured to be coupled to a first magnet and a second blade configured to be coupled to a second magnet, at least one of the blades having at least one cutout;
   electromagnetic motors configured to generate different electromagnetic fields to (i) cause the magnets to move the blades into a first configuration and (ii) cause the magnets to move the blades into a second configuration; and
   a cover plate and a base plate, the cover plate and the base plate configured to be coupled together to form a space within which the blades are located;
   wherein the blades are configured to be separated to form a larger aperture in the first configuration; and
   wherein the at least one cutout in the at least one of the blades forms a smaller aperture in the second configuration; and
a cooling system configured to cool at least the blades of the variable aperture system;
wherein the base plate comprises:
   an opening that defines the larger aperture;
   blade stops configured to stop movement of the blades when the blades are moving outward; and
   stop pins configured to stop movement of the blades when the blades are moving inward; and
wherein the blade stops and the stop pins are configured to thermally contact the blades in order to exchange heat with the blades.

17. A method comprising:
generating first electromagnetic fields that cause magnets to move first and second blades of an aperture mechanism into a first configuration, wherein the blades are separated to form a larger aperture in the first configuration; and
generating second electromagnetic fields that cause the magnets to move the blades of the aperture mechanism into a second configuration, wherein at least one cutout in at least one of the blades forms a smaller aperture in the second configuration;
wherein the aperture mechanism further comprises a cover plate and a base plate, the cover plate and the base plate coupled together to form a space within which the blades are located;
wherein the base plate includes blade stops and stop pins, the blade stops configured to stop movement of the blades when the blades are moving outward, the stop pins configured to stop movement of the blades when the blades are moving inward;
wherein the blades are in thermal contact with the blade stops in the first configuration; and
wherein the blades are in thermal contact with the stop pins in the second configuration.

18. The method of claim 17, wherein:
the first electromagnetic fields cause the blades to fully separate and expose the larger aperture, the larger aperture defined within the base plate; and
the second electromagnetic fields cause the blades to contact one another and form the smaller aperture, the smaller aperture defined by the at least one cutout.

19. The method of claim 17, wherein:
generating the first electromagnetic fields comprises generating fields with north/south poles that pull or push the magnets outward; and
generating the second electromagnetic fields comprises generating fields with opposite north/south poles that push or pull the magnets inward;
wherein the magnets are pushed or pulled without physically contacting the magnets.

20. The method of claim 17, wherein:
the first and second electromagnetic fields are generated using electromagnetic motors; and
each electromagnetic motor comprises a curved core, a first portion of each core located proximate to a first of the magnets, a second portion of each core located proximate to a second of the magnets.

* * * * *